(12) United States Patent
Balasubramanian et al.

(10) Patent No.: US 11,525,752 B2
(45) Date of Patent: *Dec. 13, 2022

(54) WATER DETECTING PRESSURE SENSORS

(71) Applicant: Apple Inc., Cupertino, CA (US)

(72) Inventors: Ashwin Balasubramanian, Sunnyvale, CA (US); William Scott Lee, Fremont, CA (US)

(73) Assignee: Apple Inc., Cupertino, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/920,396

(22) Filed: Jul. 2, 2020

(65) Prior Publication Data

US 2020/0333207 A1    Oct. 22, 2020

Related U.S. Application Data

(63) Continuation of application No. 16/010,274, filed on Jun. 15, 2018, now Pat. No. 10,739,221.

(51) Int. Cl.
| | |
|---|---|
| *G01L 9/06* | (2006.01) |
| *G01L 19/06* | (2006.01) |
| *G01L 19/00* | (2006.01) |
| *G01L 9/12* | (2006.01) |
| *G01W 1/14* | (2006.01) |

(52) U.S. Cl.
CPC .......... *G01L 19/0654* (2013.01); *G01L 9/06* (2013.01); *G01L 9/12* (2013.01); *G01L 19/0092* (2013.01); *G01W 1/14* (2013.01)

(58) Field of Classification Search
CPC ....... G01L 3/06; G01L 3/1478; G01L 3/1492; G01L 3/18; G01L 3/24; G01L 3/242; G01L 5/0057; G01L 5/08; G01L 5/10; G01L 5/101; G01L 5/108; G01L 5/167; G01L 5/171; G01L 5/22; G01L 5/28
USPC .................................................. 73/700–756
See application file for complete search history.

(56) References Cited

U.S. PATENT DOCUMENTS

| | | | |
|---|---|---|---|
| 8,336,385 B1 | 12/2012 | Bergum | |
| 9,784,887 B1 | 10/2017 | Ulmer | |
| 10,519,031 B2 | 12/2019 | Morsink et al. | |
| 10,640,367 B2* | 5/2020 | Vummidi Murali | ......................... B81B 7/0029 |
| 2002/0023499 A1 | 2/2002 | Boehler | |

(Continued)

FOREIGN PATENT DOCUMENTS

| | | |
|---|---|---|
| CN | 1658061 | 8/2005 |
| CN | 101929898 | 12/2010 |

(Continued)

OTHER PUBLICATIONS

Chinese Office Action from Chinese Patent Application No. 201910465797.5, dated Dec. 8, 2020, 12 pages including English language translation.

(Continued)

*Primary Examiner* — Andre J Allen
(74) *Attorney, Agent, or Firm* — BakerHostetler (57) ABSTRACT

A water detecting pressure-sensing device includes a metal housing including a cavity. A pressure sensor is disposed on a die and configured to generate a signal in response to a pressure variation. A protection medium at least partially fills the cavity and covers the die. One or more electrodes are disposed on the die and are used to detect a presence of a water droplet on the protection medium.

20 Claims, 5 Drawing Sheets

(56) References Cited

U.S. PATENT DOCUMENTS

| | | |
|---|---|---|
| 2002/0184954 A1 | 12/2002 | Tyson |
| 2005/0049499 A1 | 3/2005 | Kaplan |
| 2010/0230766 A1 | 9/2010 | Elian et al. |
| 2012/0210799 A1 | 8/2012 | Motoyama |
| 2014/0345389 A1 | 11/2014 | Kim |
| 2014/0373633 A1 | 12/2014 | Sato |
| 2017/0059434 A1 | 3/2017 | Li et al. |
| 2017/0350686 A1* | 12/2017 | Otaka ................ G01R 27/2617 |
| 2018/0226698 A1 | 8/2018 | Lin |
| 2019/0086283 A1* | 3/2019 | Wagner .................. G01L 7/084 |
| 2019/0281371 A1 | 9/2019 | Klicpera |
| 2020/0166471 A1* | 5/2020 | Haubold .............. G01N 27/223 |

FOREIGN PATENT DOCUMENTS

| | | |
|---|---|---|
| CN | 102759326 | 10/2012 |
| CN | 202524437 | 11/2012 |
| CN | 103017960 | 4/2013 |
| CN | 202998741 | 6/2013 |
| CN | 103561373 | 2/2014 |
| CN | 104777896 | 7/2015 |
| CN | 105204726 | 12/2015 |
| CN | 106102572 | 11/2016 |
| CN | 106153219 | 11/2016 |
| CN | 106556489 | 4/2017 |
| CN | 107025164 | 8/2017 |
| CN | 107667337 | 2/2018 |
| CN | 107941386 | 4/2018 |
| EP | 0287443 | 2/1991 |
| EP | 2284669 | 2/2011 |
| JP | 2001-083030 | 3/2001 |

OTHER PUBLICATIONS

Chinese Office Action from Chinese Patent Application No. 201910465797.5, dated Apr. 22, 2021, 7 pages including machine-generated English language translation.

* cited by examiner

WATER DETECTING PRESSURE SENSORS

This application is a continuation of the U.S. application Ser. No. 16/010,274, filed Jun. 15, 2018, which is incorporated by reference herein by its entirety.

TECHNICAL FIELD

The present description relates generally to sensor technology, and more particularly, to a water detecting pressure sensor.

BACKGROUND

Portable communication devices (e.g., smart phones and smart watches) are becoming increasingly equipped with environmental sensors such pressure, temperature and humidity sensors, gas sensors and particulate matter (PM) sensors. For example, a pressure sensor can enable health and fitness features in a smart watch or a smart phone. A measured pressure can then be converted (e.g., by a processor) to other parameters related to pressure, for example, elevation, motion, flow or other parameters. Pressure sensors can be used to measure pressure in a gas or liquid environment.

Pressure sensors can vary drastically in technology, design, performance and application. In terms of employed technologies, pressure sensors can be categorized as, for example, piezoelectric, capacitive, electromagnetic, optical or potentiometric pressure sensors. The micro-electro-mechanical system (MEMS) type pressure sensors used in smart phones or smart watches are generally capacitive-type pressure sensors. Pressure sensors using interim gel have been widely used in the microelectronic devices, but the gel can be susceptible to environmental contaminations and water occlusion. There is a need for pressure sensors that can detect presence of a water droplet on the gel.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

The subject technology is directed to a water detecting miniature pressure-sensing device (e.g., having dimensions in the order of a few millimeters). The pressure-sensing device of the subject technology includes one or more electrodes for detecting a water droplet and, in some implementations, includes one or more heating elements for causing the water droplet to evaporate. The disclosed water detecting pressure-sensing device includes a metal housing, a pressure sensor, a protection medium and one or more electrodes. The pressure sensor can be a capacitive or a piezo-resistive pressure sensor. The metal housing includes a cavity and the pressure sensor is disposed on a die inside the cavity. The pressure sensor can generate a signal in response to a pressure variation. The protection medium at least partially fills the cavity and covers the die. The electrodes can be disposed on the die to detect presence of a water droplet on the protection medium.

In one or more implementations, the electrodes are four corner electrodes and are made of an electrically conductive material that is resistive to environmental chemicals. The four corner electrodes are coupled to form a joint capacitance or four different capacitances with the metal housing. Values of the joint capacitance or the four different capacitances can be affected (e.g., substantially increase) by the presence of the water droplet. In some implementations, there is a ring electrode formed around the pressure sensor. The ring electrode can be a square or a round shaped electrode and forms a capacitance with the metal housing. A value of the capacitance can be affected by the presence of the water droplet. In some implementations, the pressure-sensing device includes one or more resistive heating elements formed on the die that can cause evaporation of the water droplet. The resistive heating elements can be formed around the electrodes. In some implementations, one or more resistive heating elements can be installed around the die within the cavity.

Figure 1A:
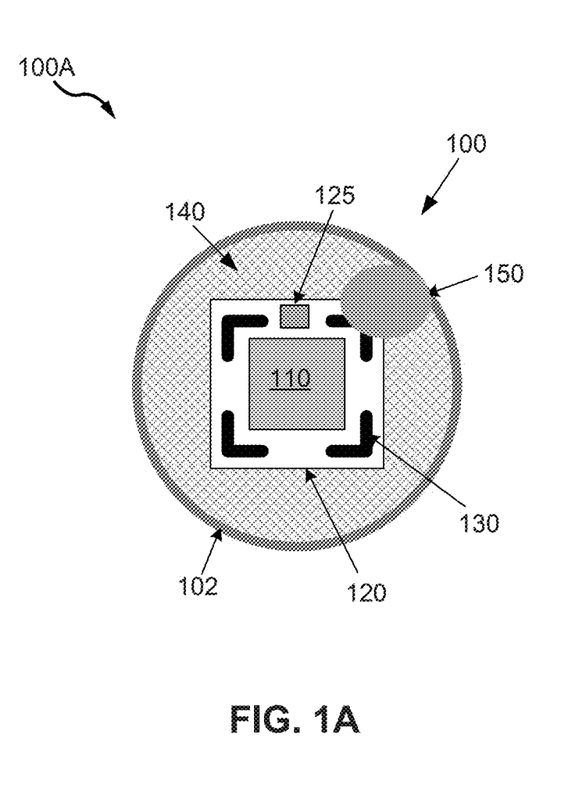
FIGS. 1A through 1C are diagrams illustrating different views of an example water detecting pressure-sensing device, in accordance with one or more aspects of the subject technology.
Figure 1B:
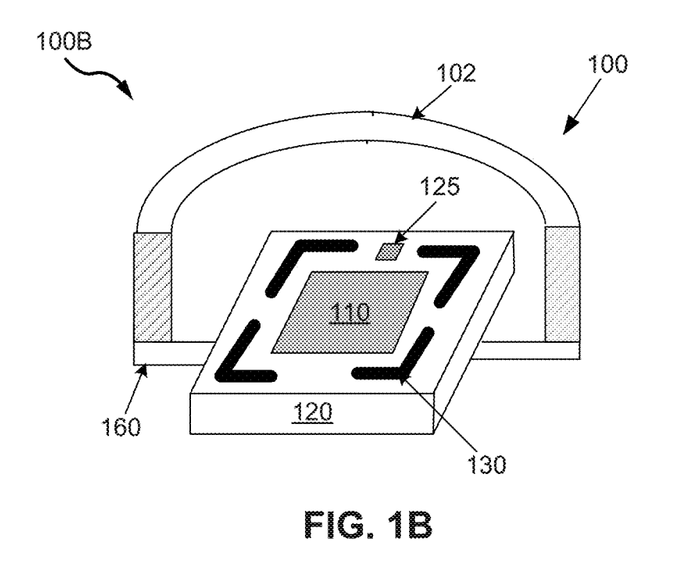
Figure 1C:
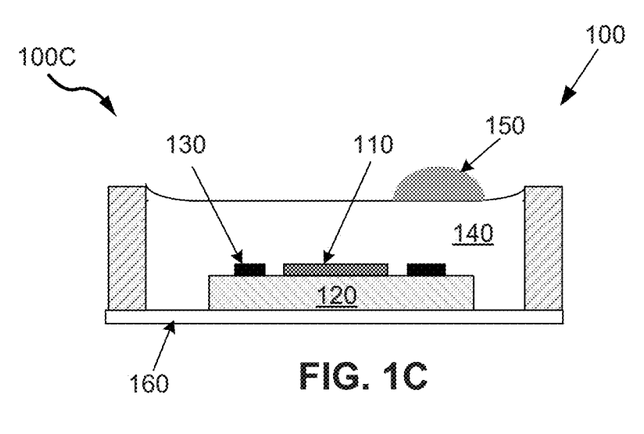

FIGS. 1A through 1C are diagrams illustrating different views of an example water detecting pressure-sensing device 100, in accordance with one or more aspects of the subject technology. The example water detecting pressure-sensing device 100 (hereinafter "device 100") shown in views 100A, 100B and 100C can be a miniature gel-filled pressure-sensing device that can detect a water droplet 150 on the gel, as discussed below. In one or more implementations, the dimensions of the device 100 are in the order of a few millimeters. FIG. 1A shows a top view of the device 100. The device 100 includes a housing 102 and a die 120 covered with a protective medium 140 (e.g., gel). In some implementations, the die 120 includes a pressure sensor 110, a set of electrodes 130 and a water detection circuit 125. In one or more implementations, the die 120 is a semiconductor die such as a silicon die on which a number of circuits, for example, an application-specific integrated circuit (ASIC) can be implemented. In one or more implementations, the water detection circuit 125 can be realized as an ASIC. In some implementations, the pressure sensor 110 can be a capacitive pressure sensor or a piezo-resistive pressure sensor and can be realized as a micro-electromechanical system (MEMS) implemented on the die 120.

The electrodes 130 (e.g., water sensing electrodes) are to sense the presence of the water droplet 150. The electrodes 130 can be distributed on the die 120 and be created, for example, on four corners of the die 120. In some implementations, the electrodes 130 can be created in the form of a ring, ring segments or an array of electrode segments around the pressure sensor 110. In one or more implementations, the electrodes 130 are made of an electrically conductive material that is resistive to environmental chemicals. In some implementations, electrodes 130 can be made of metals such as copper (Cu), aluminum (Al), silver (Ag), graphite (C), titanium (Ti), gold (Au), or other suitable metals, alloys or compounds. In some implementations, the electrodes 130 are coupled to form one of a joint capacitance or four different capacitances with the metal housing 102. In one or more implementations, the values of the joint capacitance or the four different capacitances are affected by the presence of the water droplet 150. The electrodes 130 form a capacitance with the housing 102 when the system is dry and no water is present of the protective medium 140. This capacitance can change with presence of the water droplet 150, and the capacitance change can be detected by the water detection circuit 125.

FIG. 1B depicts an inside view 100B of the device 100 through a cross-sectional cut of the housing 102. FIG. 1B also shows a substrate 160 attached to the bottom of the housing 102. The description of the die 120 is described above. The housing 102 can be made of a metal such as, for example, steel, aluminum, or other suitable metals or metal alloys. The substrate 160 can be made of the same material as the housing 102. In some implementations, the substrate 160 can be made of a different material such as a ceramic or silicon or other suitable substrate material and can be attached to the housing 102 via a suitable adhesive interface such as an epoxy.

FIG. 1C depicts a cross-sectional view 100C of the device 100 and shows that the die 120 is disposed on the substrate 160 attached to the bottom of the housing 102. As shown in the cross-sectional view 100C, the protective medium 140 partially fills the cavity formed by the housing 102 and the substrate 160. The details of the die 120, the pressure sensor 110 and the electrodes 130 are as described above.

Figure 2A:
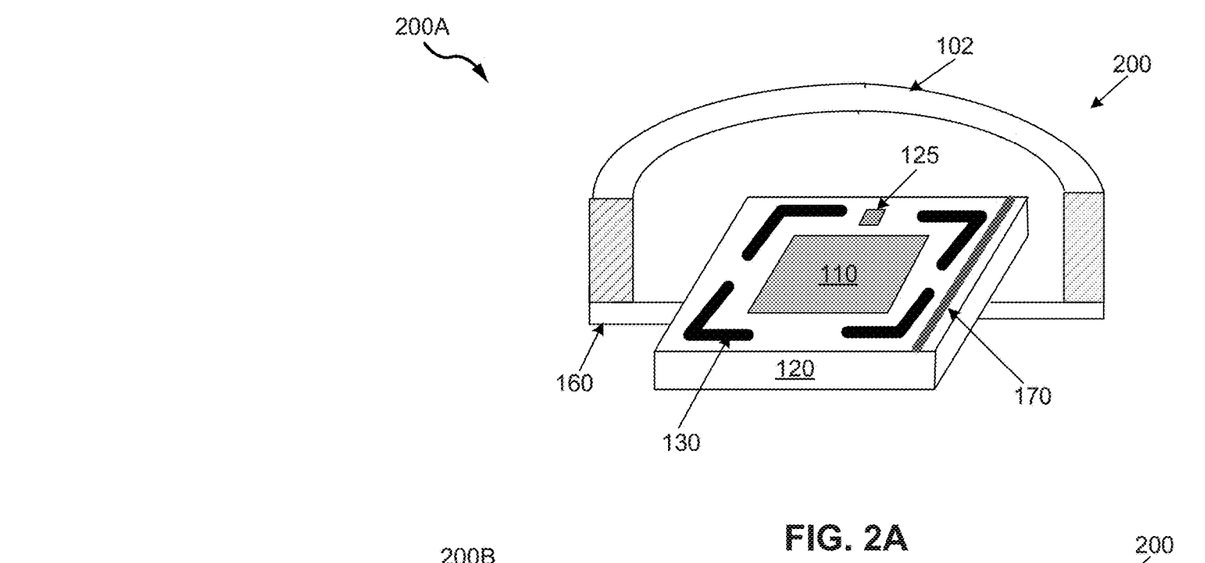
FIGS. 2A-2B are diagrams illustrating different views of an example water detecting pressure-sensing device including a heating element, in accordance with one or more aspects of the subject technology.
Figure 2B:
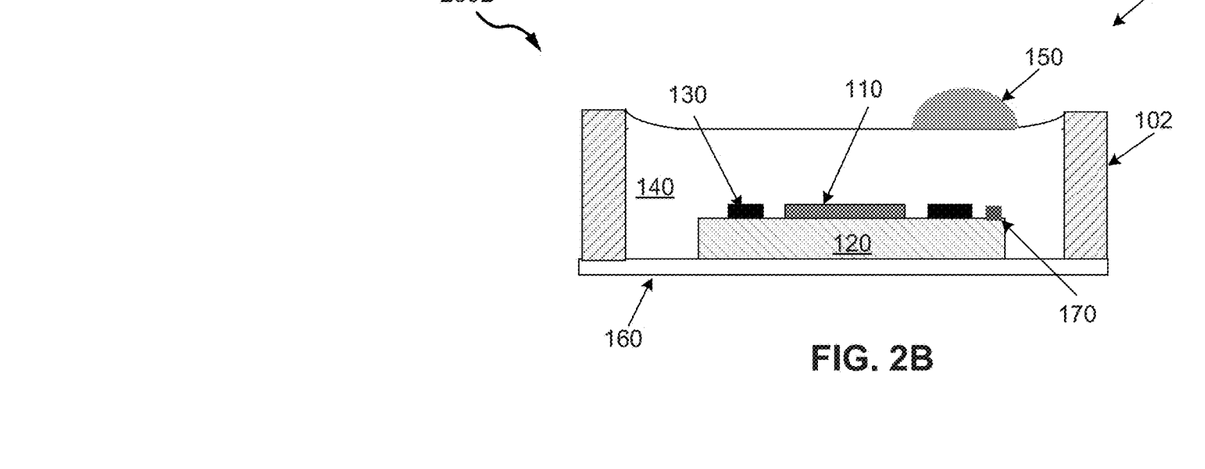

FIGS. 2A-2B are diagrams illustrating different views 200A and 200B of an example water detecting pressure-sensing device 200 including a heating element 170, in accordance with one or more aspects of the subject technology. The view 200A depicts an inside view of the device 200 through a cross-sectional cut of the housing 102. The example water detecting pressure-sensing device 200 (hereinafter "device 200") is similar to the device 100 of FIGS. 1A through 1C, except for addition of a heating element 170. In one or more implementations, the heating element 170 is s resistive heating element, for example, made of a metal or an alloy such as, nickel-chromium alloy (Ni—Cr) or iron-chromium-aluminum alloys. In one or more implementations, the heating elements 170 can be created in the forms of one or more strips, rings, ring segments, an array of dots or segments or other shapes on the die 120. In some implementations, the heating elements 170 can be created off the die 120 but inside the cavity of the housing 102, for example, on the substrate 160.

The heating elements 170 is operable to heat the device 100 to evaporate the water droplet 150. In some implementations, the heating elements 170 can be operable based on one or more signals from the water detecting circuit 125 that detects the presence of the water droplet 150. In one or more implementations, the heating elements 170 can be simultaneously or independently controlled, for example, by a microcontroller or a processor of a host device such as smart phone or a smart watch.

The view 200B of FIG. 2B depicts a cross-sectional view of the device 200, where the heating elements 170 are shown on the die 120 alongside the pressure sensor 110 and the electrodes 130. Also shown in the view 200B is the water droplet 150 on the protective medium 140 (e.g., gel), which fills the cavity formed by the housing 102 and the substrate 160.

Figure 3A:
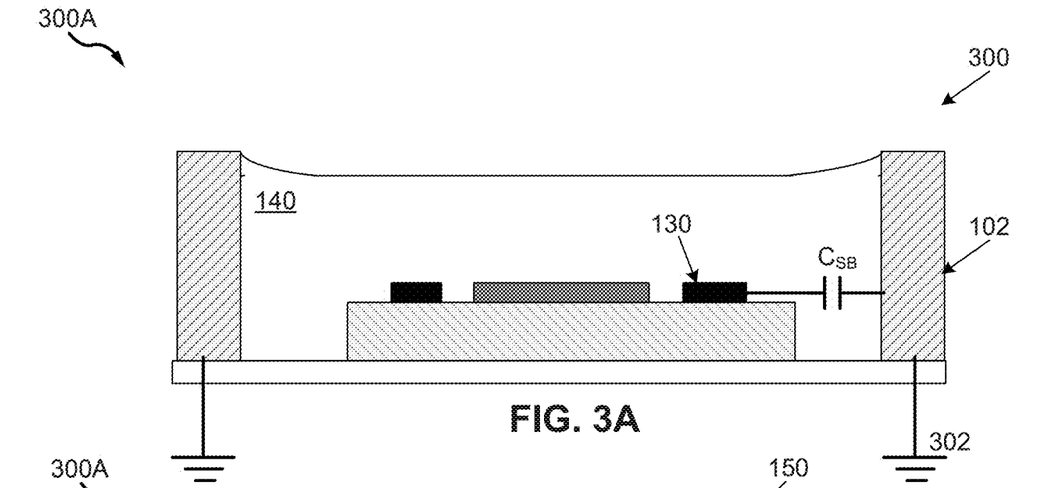
FIGS. 3A-3B are diagrams illustrating cross-sectional views showing an example water-detection mechanism of a water detecting pressure-sensing device, in accordance with one or more aspects of the subject technology.
Figure 3B:
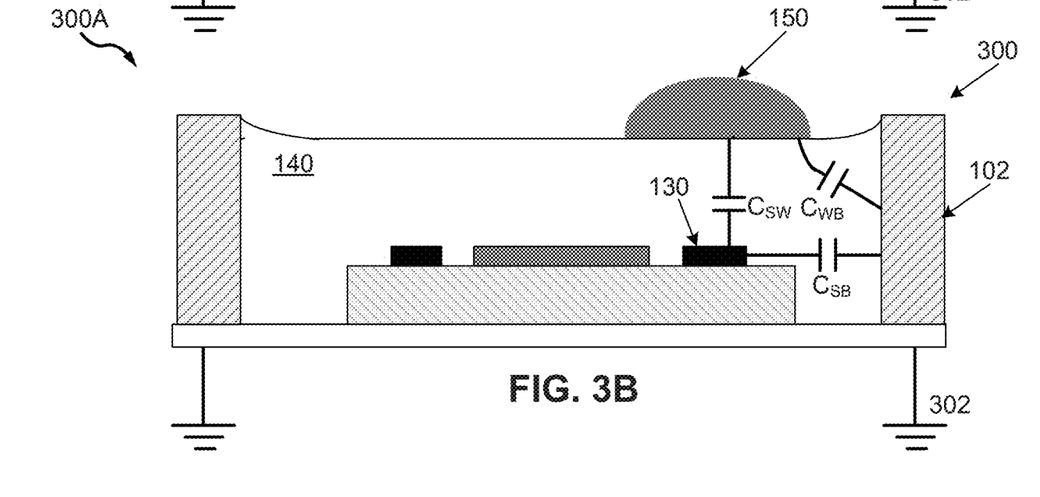

FIGS. 3A-3B are diagrams illustrating cross-sectional views 300A and 300B showing an example water-detection mechanism of a water detecting pressure-sensing device 300, in accordance with one or more aspects of the subject technology. The cross-sectional view 300A of FIG. 3A shows the example water detecting pressure-sensing device 300 (hereinafter "device 300") in a dry situation. The device 300 is similar to the device 100 of FIG. 1C, except that the water droplet 150 of FIG. 1C is not present, and a capacitor $C_{SB}$ is shown. The capacitor $C_{SB}$ represents (models) a capacitance through the protective medium 140 (e.g., gel) between the electrodes 130 (e.g., water sensing electrodes) and the housing 102 (body), which is grounded by a connection to a ground potential 302. In some implementations, the electrodes 130 are coupled to form one of a joint capacitance or four different capacitances with the housing 102. The value of the capacitor $C_{SB}$ is relatively constant as long as there is no water droplet on the protective medium 140. The capacitor $C_{SB}$ is a dry capacitance ($C_D$) of the electrodes 130 (e.g., $C_D = C_{SB}$). The presence of a water droplet (e.g., 150) will change the capacitance between the electrodes 130 and the housing 102 as discussed below.

The cross-sectional view 300B of FIG. 3B depicts the device 300 in a wet situation. Again, the device 300 is similar to the device 100 of FIG. 1C, except for the capacitors $C_{SB}$, $C_{SW}$ and $C_{WB}$ shown in FIG. 3B. The capacitor $C_{SW}$ represents a capacitance through the protective medium 140 (e.g., gel) between the electrode 130 and the water droplet 150. The capacitor $C_{WB}$ represents a capacitance through the protective medium 140 (e.g., gel) between the water droplet 150 and the housing 102, which is grounded by a connection to the ground potential 302. These three capacitances add up to form a wet capacitance ($C_W$) of the electrodes 130, which can be expressed as:

$$C_W = C_{SB} + C_{diff} \quad (1)$$

Where $C_{diff}$ is a difference capacitance due to $C_{SW}$ and $C_{WB}$ and its value is related to the values of $C_{SW}$ and $C_{WB}$ as shown by the following expression:

$$C_{diff} = (1/C_{SW} + 1/C_{WB})^{-1} > 0 \quad (2)$$

From the expressions (1) and (2), it is clear that $C_W$ is greater than $C_D$. In practice, the values of the above capacitances may be in the pF range and the value of the difference capacitance $C_{diff}$ may be a few pF, and can be measured by the water detection circuit 125 of FIG. 1A. As soon as the water detection circuit 125 detects presence of the water droplet 150, it can alert the heating elements 170 of FIG. 2A, directly or through a processor (e.g., a processor of the host device such as a smart phone or a smart watch), to turn on to generate heat that can evaporate the water droplet 150.

Figure 4:
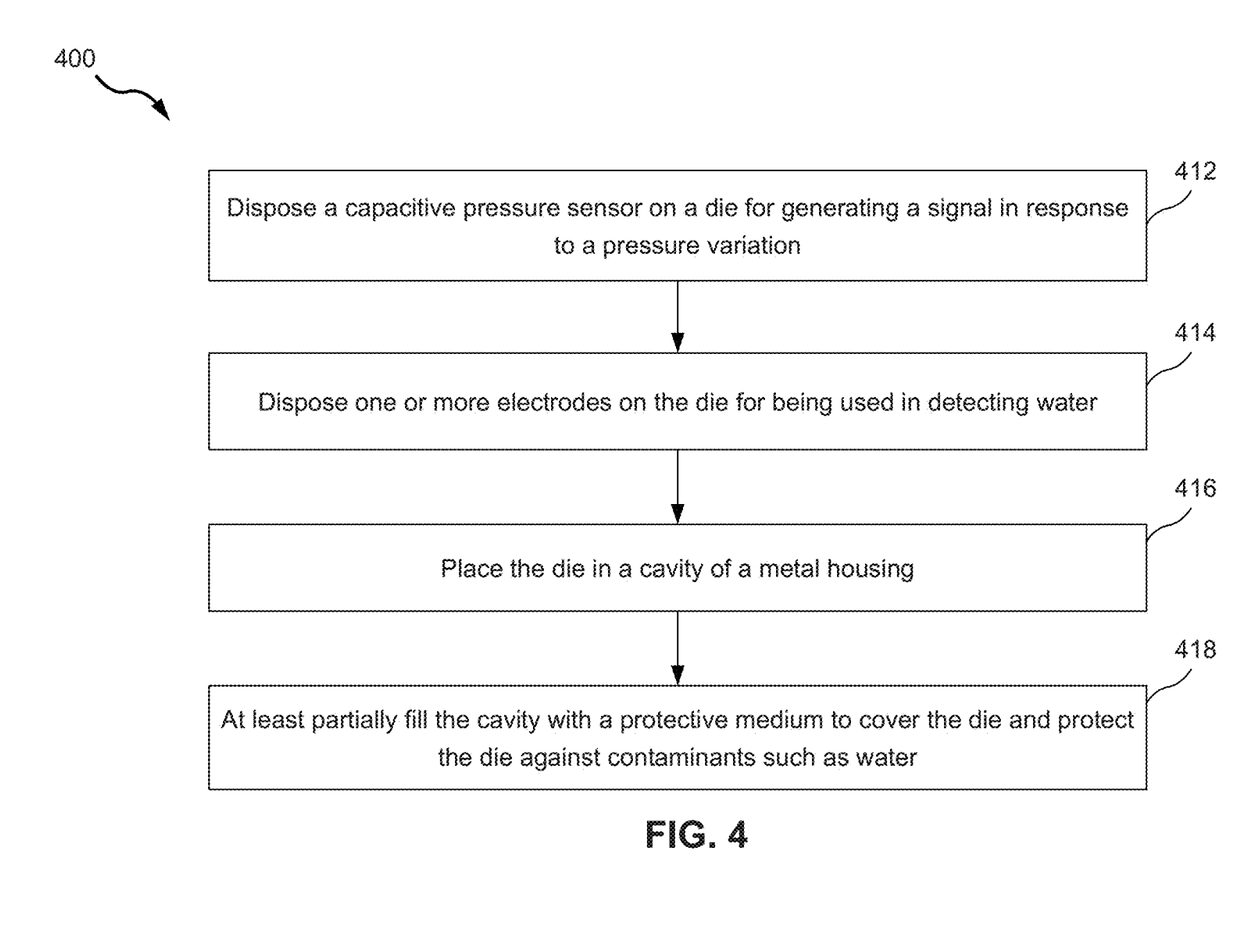
FIG. 4 is a flow diagram illustrating a process of assembling an example water detecting pressure-sensing device, in accordance with one or more aspects of the subject technology.

FIG. 4 is a flow diagram illustrating a process 400 of assembling an example water detecting pressure-sensing device, in accordance with one or more aspects of the subject technology. The process 400 begins with disposing a capacitive or piezo-resistive pressure sensor (e.g., 110 of FIG. 1A) on a die (e.g., 120 of FIG. 1A) for generating a signal in response to a pressure variation (412). The process 400 further includes disposing one or more electrodes (e.g., 130 of FIG. 1A) on the die for being used in detecting water (e.g., 150 of FIG. 1A) (414). The die can be placed in a cavity of a metal housing (e.g., 102 of FIG. 1A) (416). A protective medium (e.g., 140 of FIG. 1A) at least partially fills the cavity and covers the die and protects the die against contaminants such as water (418).

Figure 5:
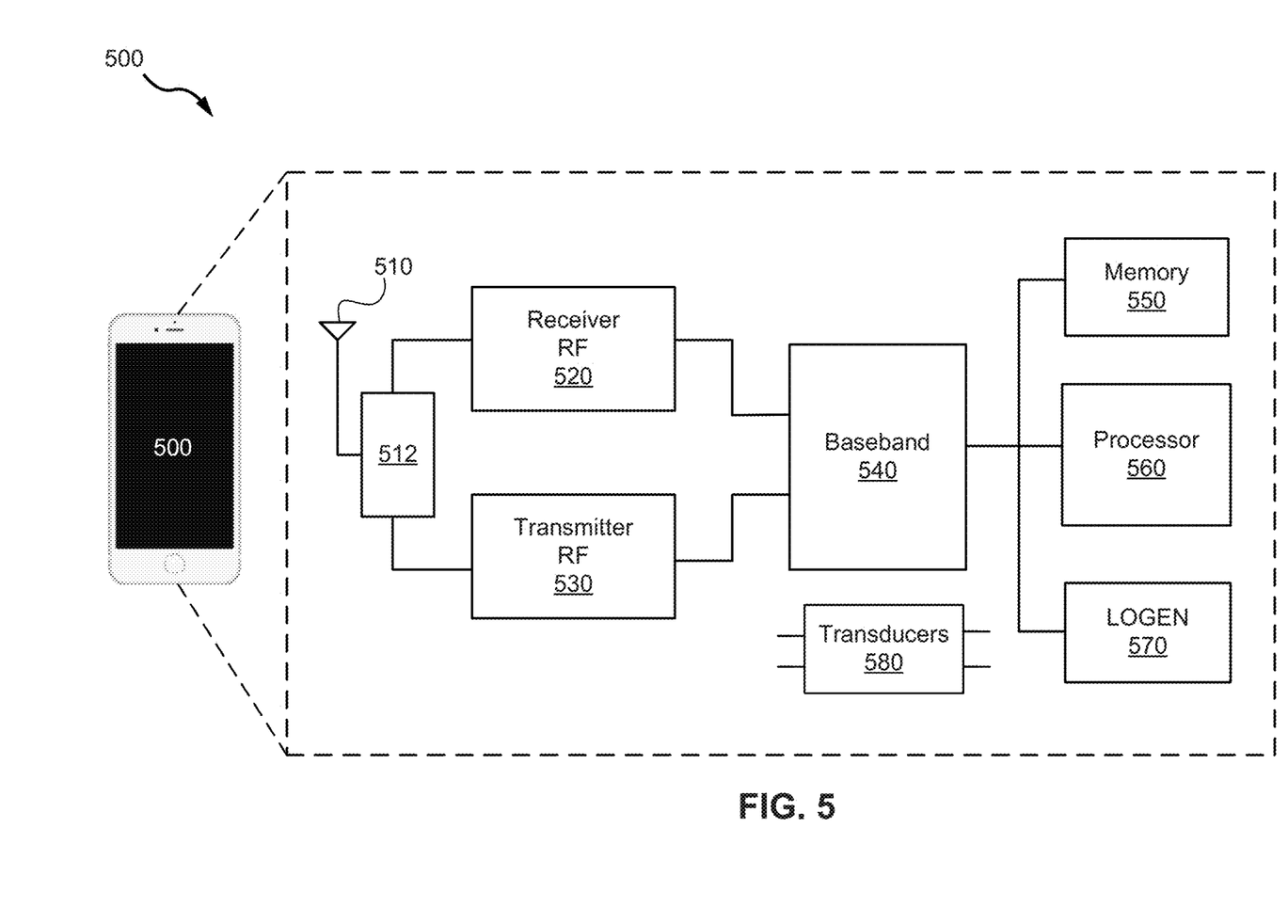
FIG. 5 is a block diagram illustrating an example wireless communication device, within which one or more water detecting pressure-sensing device of the subject technology can be integrated.

FIG. 5 is a block diagram illustrating an example wireless communication device 500, within which one or more water detecting pressure-sensing device of the subject technology can be integrated. In one or more implementations, the wireless communication device 500 can be a smart phone or a smart watch. The wireless communication device 500 may comprise a radio-frequency (RF) antenna 510, a receiver 520, a transmitter 530, a baseband processing module 540, a memory 550, a processor 560, a local oscillator generator (LOGEN) 570 and one or more transducers 580. In various embodiments of the subject technology, one or more of the blocks represented in FIG. 5 may be integrated on one or more semiconductor substrates. For example, the blocks 520-570 may be realized in a single chip or a single system on a chip, or may be realized in a multi-chip chipset.

The receiver 520 may comprise suitable logic circuitry and/or code that may be operable to receive and process signals from the RF antenna 510. The receiver 520 may, for example, be operable to amplify and/or down-convert received wireless signals. In various embodiments of the subject technology, the receiver 520 may be operable to cancel noise in received signals and may be linear over a wide range of frequencies. In this manner, the receiver 520 may be suitable for receiving signals in accordance with a variety of wireless standards, Wi-Fi, WiMAX, Bluetooth, and various cellular standards. In various embodiments of the subject technology, the receiver 520 may not require any SAW filters and few or no off-chip discrete components such as large capacitors and inductors.

The transmitter 530 may comprise suitable logic circuitry and/or code that may be operable to process and transmit signals from the RF antenna 510. The transmitter 530 may, for example, be operable to up-convert baseband signals to RF signals and amplify RF signals. In various embodiments of the subject technology, the transmitter 530 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer may be operable in multiple frequency bands of various wireless standards.

The baseband processing module 540 may comprise suitable logic, circuitry, interfaces, and/or code that may be operable to perform processing of baseband signals. The baseband processing module 540 may, for example, analyze received signals and generate control and/or feedback signals for configuring various components of the wireless communication device 500, such as the receiver 520. The baseband processing module 540 may be operable to encode, decode, transcode, modulate, demodulate, encrypt, decrypt, scramble, descramble, and/or otherwise process data in accordance with one or more wireless standards.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control transfers of data between various portions of the wireless communication device 500. Additionally, the processor 560 may enable implementation of an operating system or otherwise execute code to manage operations of the wireless communication device 500.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various embodiment of the subject technology, information stored in the memory 550 may be utilized for configuring the receiver 520 and/or the baseband processing module 540.

The local oscillator generator (LOGEN) 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals such as the frequency and duty cycle may be determined based on one or more control signals from, for example, the processor 560 and/or the baseband processing module 540.

In operation, the processor 560 may configure the various components of the wireless communication device 500 based on a wireless standard according to which it is desired to receive signals. Wireless signals may be received via the RF antenna 510, amplified, and down-converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 550, and/or information affecting and/or enabling operation of the wireless communication device 500. The baseband processing module 540 may modulate, encode, and perform other processing on audio, video, and/or control signals to be transmitted by the transmitter 530 in accordance with various wireless standards.

The one or more transducers 580 may include the miniature water detecting pressure-sensing device of the subject technology, for example, as shown in FIGS. 1A through 1C and/or 2A-2B and described above. The miniature water detecting pressure-sensing device of the subject technology can be readily integrated into the communication device 500, in particular, when the communication device 500 is a smart mobile phone or a smart watch. In one or more implementations, the processor 560 can process pressure signals from the integrated pressure-sensing device of the subject technology, after being converted to digital signals by an ADC (e.g., an ADC of the communication device 500), to convert a measured pressure value to a value of a corresponding parameter such as elevation, motion or other parameters. The processor 560 can further process signals from the water detection circuit (e.g., 125 of FIG. 1A) and to turn on the heating element (e.g., 170 of FIG. 2A) to heat the protective medium (e.g., 140 of FIG. 2A). In one or more implementations, the memory 550 can store measured pressure values, converted values, e.g., of the corresponding parameters such as elevation or motion or other parameters, and/or look-up tables for such conversions.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A water detecting pressure-sensing device, the device comprising:
    a pressure sensor disposed on a die;
    a protection medium to cover the die; and
    one or more electrodes disposed on the die and used to detect a presence of a water droplet on the protection medium.

2. The device of claim 1, wherein the pressure sensor comprises a capacitive or piezo-resistive pressure sensor, and wherein the one or more electrodes comprise four corner electrodes, and wherein the one or more electrodes are made of an electrically conductive material that is resistive to environmental chemicals.

3. The device of claim 2, further comprising a metal housing including a cavity, wherein the four corner electrodes are coupled to form one of a joint capacitance or four different capacitances with the metal housing, and wherein values of the joint capacitance or the four different capacitances are affected by the presence of the water droplet.

4. The device of claim 3, wherein the one or more electrodes comprise a ring electrode or segments of a ring formed on the die and around the pressure sensor.

5. The device of claim 4, wherein the ring electrode comprises a square or a round-shaped electrode and forms a capacitance with the metal housing, and wherein a value of the capacitance is affected by the presence of the water droplet.

6. The device of claim 1, further comprising one or more resistive heating elements, wherein the one or more resistive heating elements are formed on the die around the one or more electrodes.

7. The device of claim 1, further comprising one or more resistive heating elements, wherein the one or more resistive heating elements are within a cavity in spaces off the die.

8. The device of claim 1, further comprising a detection circuit configured to detect a change in a capacitance of the one or more electrodes in response to the presence of the water droplet on the protection medium, wherein the detection circuit is implemented on the die, and wherein the detection circuit is implemented using an application specific integrated circuit (ASIC).

9. A communication device comprising:
    a processor; and
    a device comprising:
        a pressure sensor disposed on a die;
        a protection medium disposed to cover the die;
        one or more electrodes disposed on the die; and
        a detection circuit configured to detect a change in a capacitance of the one or more electrodes in response to a presence of a water droplet on the protection medium.

10. The communication device of claim 9, wherein the pressure sensor comprises a capacitive or piezo-resistive pressure sensor, and wherein the one or more electrodes are disposed on the die.

11. The communication device of claim 9, wherein the one or more electrodes are made of an electrically conductive material that is resistive to environmental chemicals, and wherein the one or more electrodes comprise four corner electrodes.

12. The communication device of claim 11, further comprising a metal housing including a cavity, wherein the four corner electrodes are coupled to form one of a joint capacitance or four different capacitances with the metal housing, and wherein values of the joint capacitance or the four different capacitances are affected by the presence of the water droplet.

13. The communication device of claim 12, wherein the one or more electrodes comprise a ring electrode formed around the pressure sensor, and wherein the ring electrode comprises a square or a round shaped electrode and the capacitance of the one or more electrodes is formed with the metal housing, and wherein a value of the capacitance is affected by the presence of the water droplet.

14. The communication device of claim 12, wherein the device further comprises one or more resistive heating elements controllable by the processor, wherein the one or more resistive heating elements are formed around the one or more electrodes on the die.

15. The communication device of claim 12, wherein the device further comprises one or more resistive heating elements controllable by the processor, wherein the one or more resistive heating elements are disposed off the die, within the cavity.

16. An apparatus comprising:
a pressure sensor disposed on a die;
a protection medium disposed to cover the die; and
one or more electrodes disposed to facilitate detection of a presence of a water droplet on the protection medium.

17. The apparatus of claim 16, wherein the one or more electrodes comprise four corner electrodes, and wherein the one or more electrodes are made of an electrically conductive material that is resistive to environmental chemicals.

18. The apparatus of claim 16, further comprising a metal housing including a cavity, wherein the pressure sensor comprises a capacitive or piezo-resistive pressure sensor, wherein the one or more electrodes comprise a ring electrode formed around the pressure sensor, wherein the ring electrode comprises a square or a round shaped electrode and forms a capacitance with the metal housing, and wherein a value of the capacitance is affected by the presence of the water droplet.

19. The apparatus of claim 18, further comprising one or more resistive heating elements disposed within the cavity, wherein the one or more resistive heating elements are disposed on the die or off the die and around the die.

20. The apparatus of claim 16, further comprising a detection circuit configured to detect a change in a capacitance of the one or more electrodes in response to the presence of the water droplet on the protection medium, wherein the detection circuit is implemented using an application specific integrated circuit (ASIC) on the die.

* * * * *